(12) United States Patent
Johannsen

(10) Patent No.: US 11,860,061 B2
(45) Date of Patent: Jan. 2, 2024

(54) UNDERCARRIAGE WEAR MEASUREMENT USING A GYRO SENSOR

(71) Applicant: Caterpillar Inc., Peoria, IL (US)

(72) Inventor: Eric James Johannsen, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 108 days.

(21) Appl. No.: 17/498,953

(22) Filed: Oct. 12, 2021

(65) Prior Publication Data
US 2023/0110852 A1 Apr. 13, 2023

(51) Int. Cl.
*G01M 17/03* (2006.01)
*B62D 55/12* (2006.01)
*B62D 55/20* (2006.01)

(52) U.S. Cl.
CPC ............ *G01M 17/03* (2013.01); *B62D 55/12* (2013.01); *B62D 55/202* (2013.01)

(58) Field of Classification Search
CPC ...... G01M 17/03; B62D 55/12; B62D 55/202
See application file for complete search history.

(56) References Cited

U.S. PATENT DOCUMENTS

| 9,475,526 | B2 | 10/2016 | McKinley et al. | |
|---|---|---|---|---|
| 9,592,866 | B2 | 3/2017 | Hasselbusch et al. | |
| 11,060,988 | B2 | 7/2021 | Baarman et al. | |
| 2016/0177542 | A1* | 6/2016 | Johannsen | B62D 55/125 701/34.4 |
| 2017/0261450 | A1* | 9/2017 | Baarman | G01N 25/72 |
| 2017/0356164 | A1 | 12/2017 | Recker et al. | |
| 2021/0088416 | A1* | 3/2021 | Grenzi | B62D 55/32 |

FOREIGN PATENT DOCUMENTS

WO 2019097556 A1 5/2019

* cited by examiner

*Primary Examiner* — Eric S. McCall
*Assistant Examiner* — Timothy P Graves

(57) ABSTRACT

A track component for use with a track assembly includes a gyro sensor that monitors a track wrap angle of the track chain assembly about the idler wheel, or the drive sprocket.

18 Claims, 5 Drawing Sheets

UNDERCARRIAGE WEAR MEASUREMENT USING A GYRO SENSOR

TECHNICAL FIELD

The present disclosure relates generally to a track assembly that employs track chains used on endless track drive vehicles. More particularly, the present disclosure relates to such track assemblies having a wear monitoring system.

BACKGROUND

Track type machines (may also be referred to as a "mobile machine") may be used to perform various types of work on different worksites, such as a construction site, a demolition site, a mining site, a landfill sight, an agricultural site, etc. For example, a bulldozer may be used to push soil and rock on a construction site. The bulldozer, as a track-type mobile machine, may include a tracked undercarriage with tracks on the left and right sides of the machine. Each of the tracks includes a track chain formed by connecting a number of track links to one another, and connecting a number of track shoes to the chains. The track chains are supported and guided in movement by various driver, idler, and/or roller assemblies on both sides of the machine.

Operation of the mobile machine inevitably results in wear or damage to various components, including components of the undercarriage such as the track links, idler, and roller assemblies. For instance, a track assembly operates, a surface of each track link may wear away through contact with other components of the track assembly, machine, and/or outside materials (e.g., the ground). When the component experiences a certain amount of wear, the component has exceeded its usable lifetime and should be replaced. When the undercarriage as a whole experiences a certain amount of wear, an overhaul of the undercarriage may be necessary.

One solution is to perform such maintenance at periodic time intervals based on the type of machine, the type of work its performing, and the environment in which the machine is operating, etc. However, this method has drawbacks as maintenance may be performed too early or not early enough, negatively affecting the profitability of the operation in which the machine is employed.

Other solutions have included using various type of wear monitoring systems that measure the wear in real time so a more accurate assessment of the need for maintenance may be achieved. For example, U.S. Pat. Application Publ. No. 2021/0088416 A1 discloses a monitoring system for automatically estimating and monitoring the alignment of tracks of a track-type vehicle. The track-type vehicle may include an undercarriage with two tracks, each of which may include a track chain with a plurality of chain links and articulated joints. The monitoring system includes at least one undercarriage sensor that is fixable on the undercarriage, at least one chain sensor that is fixable on the track chain of the two tracks, and a processor configured to combine the detections of the sensors to determine the alignment direction of the tracks and to compare the determined direction with a reference alignment direction. If there is too great a deviation, then the operator is alerted that maintenance may be necessary.

However, this prior monitoring system requires the use of multiple sensors, making the monitoring system itself more prone to maintenance than desired. That is to say, if one of the sensors malfunctions, then the system is not useful Accordingly, there is exists a need for a wear monitoring system that is more robust.

SUMMARY

A track assembly for a mobile machine according to an embodiment of the present disclosure may comprise a track chain assembly including a plurality of track components, a drive sprocket, an idler, and a wear monitoring system. The wear monitoring system may include a track wrap angle sensor that is attached at least one of the plurality of track components.

A track component for use with a track assembly having an idler wheel according an embodiment of the present disclosure may comprise a gyro sensor that monitors a track wrap angle about the idler wheel.

A method of monitoring the wear of a track assembly having a track link, a drive sprocket, a track pin, and an idler according to an embodiment of the present disclosure may comprise detecting a change in the track wrap angle.

DETAILED DESCRIPTION

Figure 1:
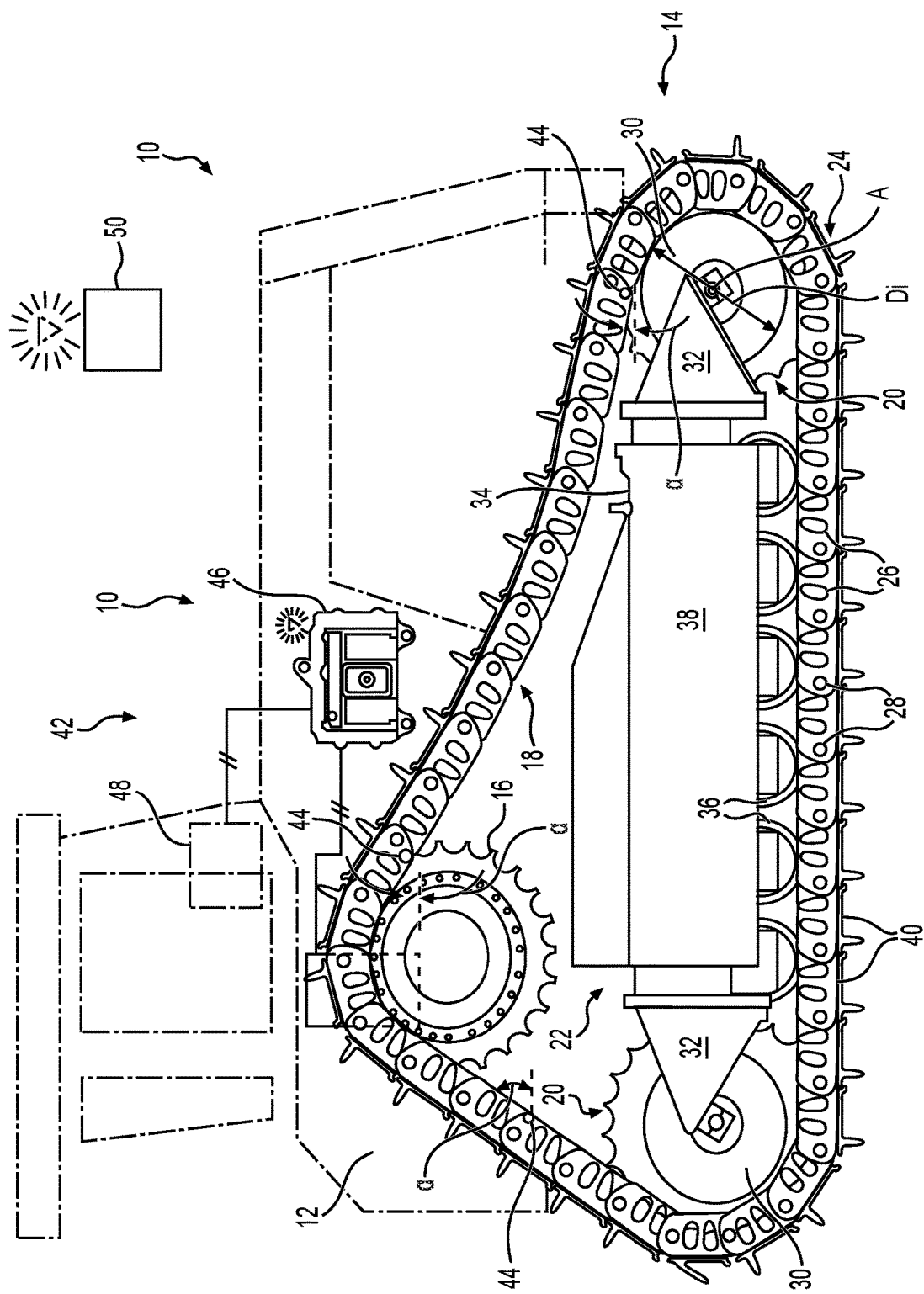
FIG. 1 is a side view of a mobile machine having a track assembly and a wear monitoring system for the track assembly according to an embodiment of the present disclosure.

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises a list of elements does not include only those elements but may include other elements not expressly listed or inherent to such a process, method, article, or apparatus. In this disclosure, relative terms, such as, for example, "about," "substantially," and "approximately" are used to indicate a possible variation of ±10% in the stated value.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or by a prime for example, 100', 100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

FIG. 1 illustrates an exemplary track-type machine 10, such as one that is driven, propelled, positioned, and/or maneuvered by operating a "continuous" track-type traction device. Such machines may include, for example, track-type tractors, skid steers, dozers, excavators, backhoes, track loader, front shovels, rope shovels, hydraulic mining shovers, etc. The machine may include a frame 12 and a pair of track assemblies 14 (only one shown) that are secured to the frame 12 on opposing sides of the machine. The track assembly 14 may include a drive sprocket 16 coupled to a drive mechanism (not shown), and a chain assembly 18 operatively coupled to the driving mechanism by the drive sprocket 16 and configured to propel machine 10.

The drive mechanism may include one or more components configured to generate a torque output. For example, the driving mechanism may include any suitable type of internal combustion engine, such as gasoline, diesel, natural gas, or hybrid-powered engine or turbine. Alternatively or additionally, the driving mechanism may embody an electric motor, electrically coupled to an electric power source and configured to convert at least a portion of the electrical energy from the electric power output into mechanical energy. According to yet another embodiment, the driving mechanism may include a hydraulic motor fluidly coupled to a hydraulic pump that is configured to convert a fluid pressurized by the pump into a torque output.

The drive sprocket 16 may be coupled to the driving mechanism via a shaft, which may provide an interface for delivering torque generated by the driving mechanism to the drive sprocket 16. For example, the drive sprocket 16 may be secured (e.g., welded, bolted, heat-coupled, etc.) to a hub associates with a shaft so that the drive sprocket rotates in response to the torque generated by the driving mechanism. In some embodiments, drive sprocket 16 may be directly coupled via a drive shaft to the driving mechanism. Alternatively, the drive sprocket 16 may be coupled to the driving mechanism via a torque converter (such as a gearbox, transmission, etc.), so that rotation of the drive sprocket 16 is proportional to the torque generated by the driving mechanism.

The track assembly 14 may include a plurality of components that form the "continuous" track, ground-engaging portion of the drive system of the machine 10. Track assembly 14 may include, among other things, the drive sprocket 16, the chains assembly 18, at least one idler assembly 20, a roller assembly 22, and a track assembly 24. However, it should be understood that these components of the track assembly 14 are exemplary only and not intended to be limiting. Accordingly, the track assembly 14 may include additional and/or different components than those listed above.

The chain assembly 18 may form a continuous chain connected around the outer portions of the drive sprocket 16, the idler assemblies, and the roller assembly 22. The traction assembly 24 may be connected to an outer portion of chain assembly 18 and configured to engage a ground surface beneath the track-type machine 10. In use, rotation of the drive sprocket 16 may cause chain assembly 18 to move around drive sprocket 16, idler assemblies 20, and the roller assembly 22, causing the traction assembly to engage the ground thereby propel the track-type machine 10.

Figure 3:
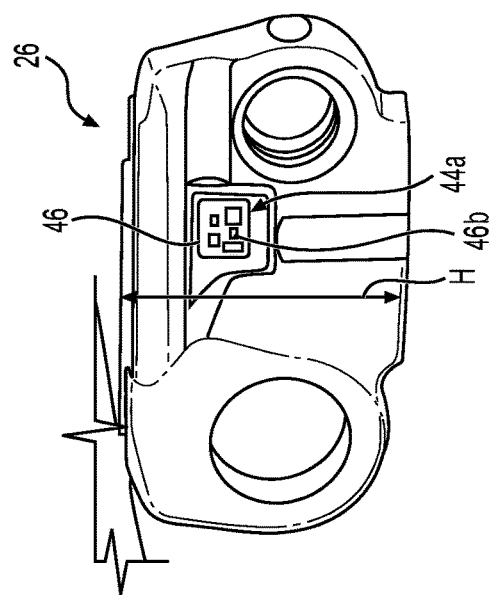
FIG. 3 is a perspective view of a track link with a gyro sensor attached for monitoring the wear of the track assembly such as that shown in FIG. 1.
Figure 4:
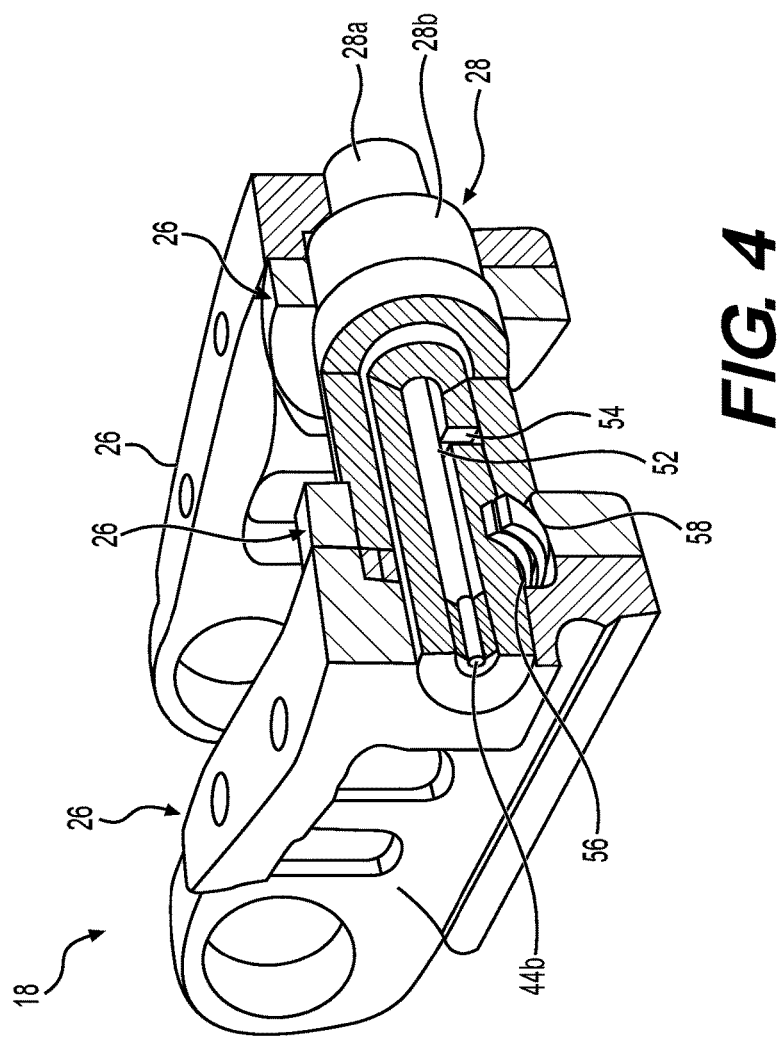
FIG. 4 is partial cross-sectional view of a portion of a track chain assembly that may be used in a track assembly such as that shown in FIG. 1. A gyro sensor is shown disposed at the end of the central bore of the track pin.

In an exemplary embodiment, the chain assembly 18 may include a plurality of interconnected track links 26 (see also FIGS. 3 and 4). It is to be understood that "track link", as used herein, may refer to any linkage component of a continuous chain for a track-type machine, and is not limited to the track links 26 specifically shown herein (e.g., the upper portion of track pads used on larger machines to create an articulated joint of a track chain assembly is also a "track link", etc.). In one embodiment, adjacent (e.g., consecutive) track links 26 may be coupled together via a plurality of track pin assemblies 28. In an exemplary embodiment, the chain assembly 18 may include two parallel sets of track links, connected to each other by track pin assemblies 28 (see FIG. 4).

Figure 2:
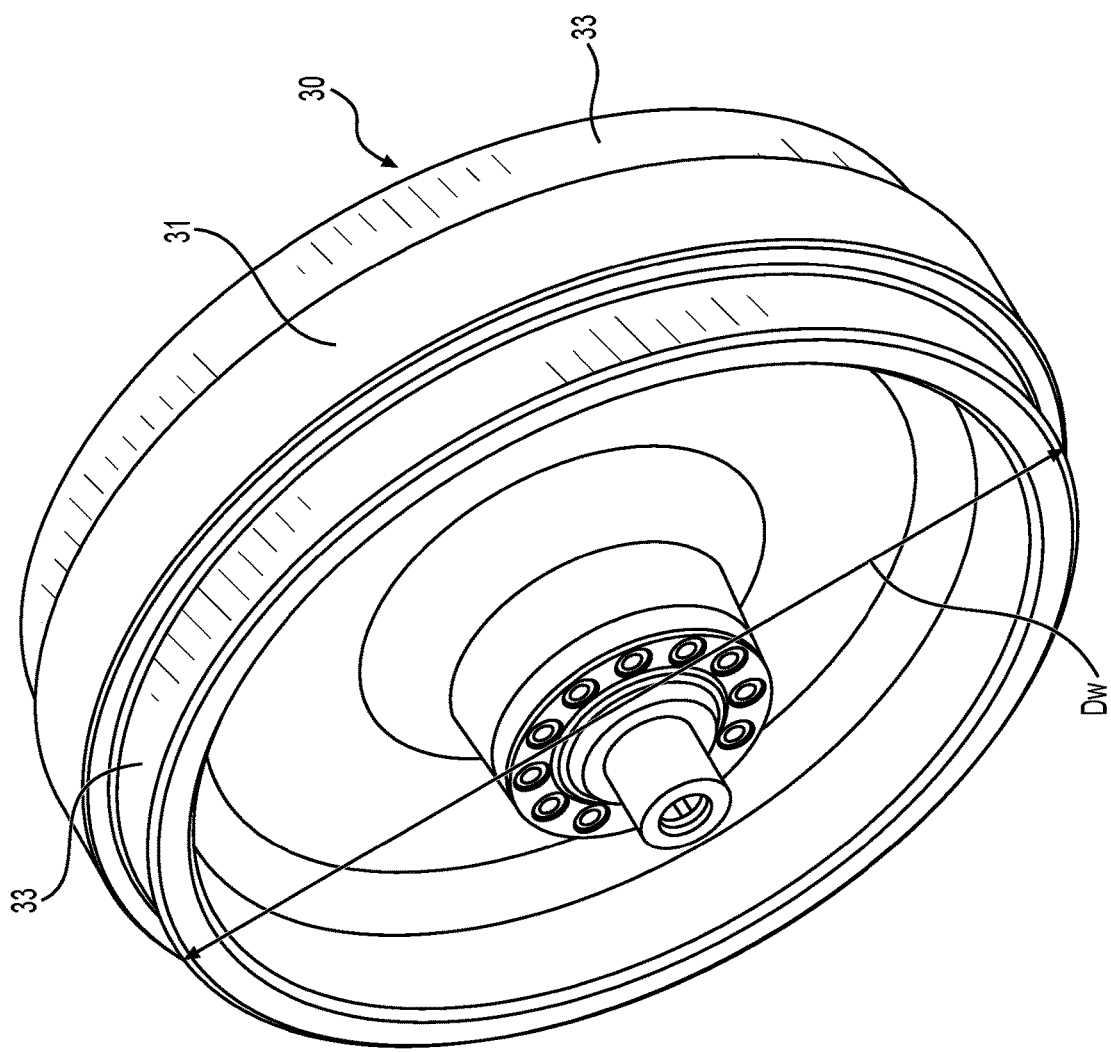
FIG. 2 is an idler of the track assembly of FIG. 1 shown in isolation.

The idler assemblies 20 (see FIGS. 1 and 2) may include components configured to guide the chain assembly 18 as it moves around the track assembly 14. For example, each idler assembly 20 may include an idler 30 and a mount 32. The idlers 30 may include features to engage the chain assembly 18. For example, idlers 30 may include engagement surfaces configured to contact and guide the track links 26 as they pass around the idler (e.g., see guide rail 31 and tread surface 33).

Each mount 32 may hold the idler 30 in place on the machine 10 through a connection to the frame 12. In an exemplary embodiment, and adjustment mechanism 34 (e.g., a hydraulic cylinder) may be connected to at least one mount 32, such as to adjust a position of an associated idler 30 (e.g., extend one idler 30 away from another idler 30). Adjusting the position of the idler 30 may increase or decrease the tension of the chain assembly 18.

As best seen in FIG. 1, the roller assembly 22 may also include components that are configured to guide the chain assembly 18. For example, the roller assembly 22 may include a plurality of rollers 36 and a roller frame 38. The roller frame 38 may be mounted to the frame 12 of the machine 10. The rollers 36 may guide the chain assembly 18 at a lower side of the roller frame 38. The rollers 36 may each be suspended from the roller frame 38. Specifically, each of the rollers 36 may be rotationally supported on an axle suspended below the roller frame 38. These rollers 36 may ride on and guide the track links as they pass under the roller frame 38 (e.g., using a guide rails and tread surfaces similar to that of the idler).

The traction assembly 24 may include a plurality of track shoes 40 carried by the chain assembly 18. In some embodiments, the track shoes may be separate from the chain assembly 18, and may include a connected portion configured to be secured to one or more track links and a ground engaging portion configured to contact the ground. In other embodiments, the individual track shoes 40 and the track links 26 may be unitary being formed as one piece via a casting process, etc. (e.g., this may form a track pad mentioned earlier herein). The ground engaging portion may include one or more features (e.g., grouser bars) that provide increased traction between the track shoes 40 and the ground, but not necessarily so. Track shoes may be omitted altogether in other embodiments of the present disclosure, etc.

As the machine 10 operates, the components of the track assembly 14 will experience wear. For example, metal-on-metal contact between adjacent components may cause material at the contacting surfaces to wear away, reducing the size of the component. For instance, the contact between the track links 26 and the engaging surfaces (e.g., tread surfaces 33) of the idlers 30 (see FIG. 2) and rollers 36, and between the track pin assemblies 28 and gear teeth of the drive sprocket 16, may wear material away at the contacting surfaces. Also, contact with abrasive debris may also cause wear to these components. As a result, the height H, etc. of each track link 26 (see FIG. 3), and the diameter, etc. of the idler, etc. (see FIG. 2) may decrease from Di in FIG. 1 to Dw in FIG. 3.

So, the machine 10 may include a wear monitoring system 42 (see FIG. 1) that is configured to monitor the wear of the track assembly using one or more sensors 44. More specifically, the sensor 44 may be configured to monitor a track wrap angle α (angle the track makes with the horizontal direction) as the track changes elevation. This sensor 44 may be attached to at least one of the plurality of track components.

Figure 6:
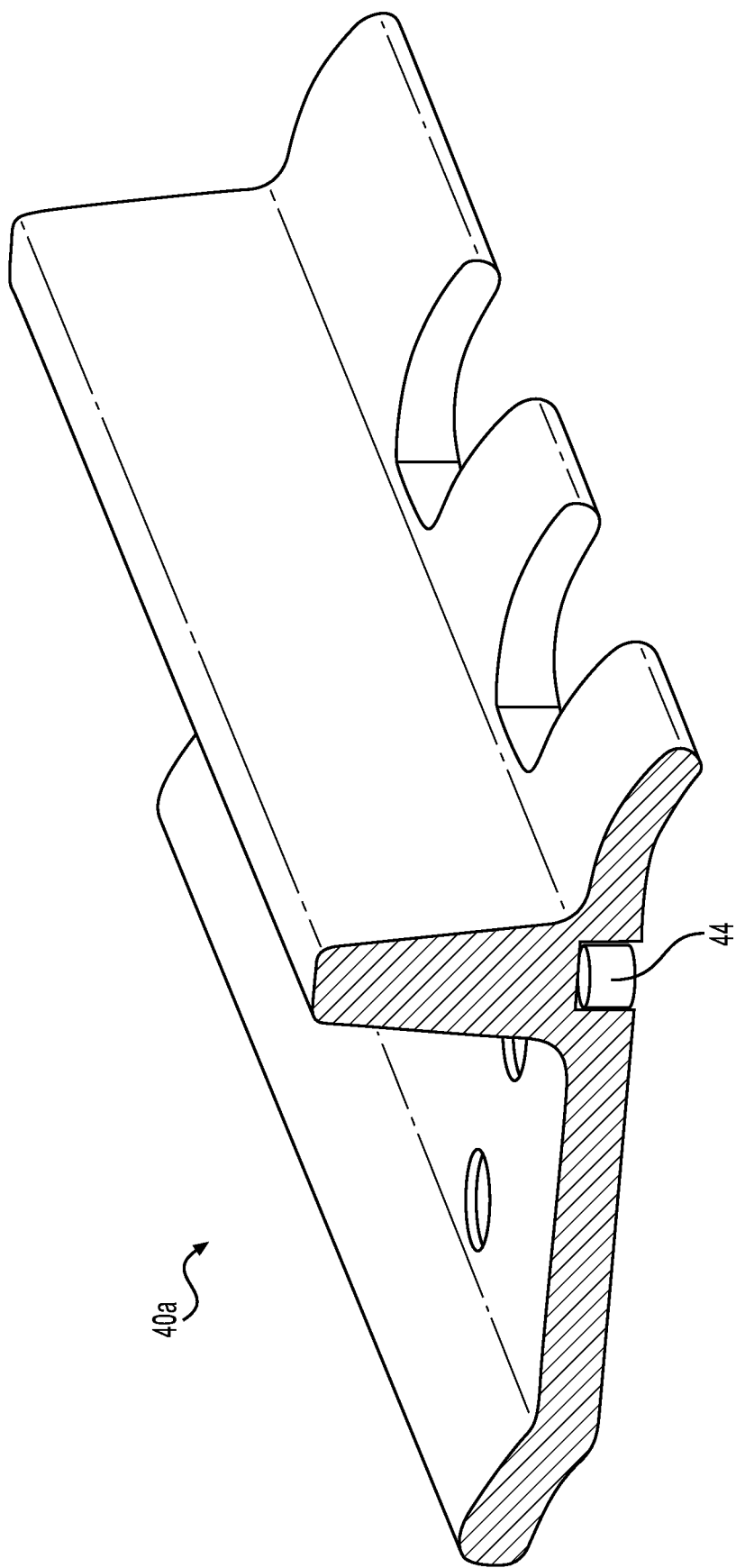
FIG. 6 shows a track shoe with a sensor according to an embodiment of the present disclosure.

In some embodiments, this sensor 44 may take the form of a gyro sensor that is attached to at least one of the following track components: a track pin 44b (see FIG. 4), and a track link 44a (see FIG. 3). Other type of sensors capable of measuring the track wrap angle may be used in other embodiments of the present disclosure. Also, the sensor may be attached to other components such as the track shoe (e.g., see FIG. 6 where track shoe 40a includes a sensor), a track pad, a bushing, a fastener, etc.

In use as depicted in FIG. 1, the sensor 44 is useful when it is disposed at a vertical level above and idler 30 (e.g., when the sensor is horizontally aligned with the axis of rotation A of the idler). At the same time, the sensor 44 may be disposed at a vertical level that is below the sprocket 16 or some portion thereof.

The wear monitoring system 42 may also include a controller 46 that is in communication with the track wrap angle sensor 44. The controller 46 is configured to determine an amount of wear of the track assembly 24 based on the track wrap angle α of the track chain assembly 18. In many embodiments, the wear monitoring system 42 may include a plurality of track wrap angle sensors 44 (see FIG. 1) that are attached to the plurality of track components such that the plurality of track wrap angle sensors 44 are attached to different track components of the plurality of track components. Hence, these sensors 44 are spaced away from each other, allowing the system to determine the track wrap angle at different locations simultaneously. The controller 46 as shown in FIG. 1 may be located in the engine compartment or the cab of the machine so that it is less prone to damage. That is to say, the controller 46 is not attached to the track chain assembly in FIG. 1, but it could be in other embodiments of the present disclosure.

The controller 46 may embody a single microprocessor or multiple microprocessors, a single microcontroller or multiple microcontrollers that include a means for controlling an operation of the monitoring system 42. Numerous commercially available devices can be used as the controller. The controller could be, at least in part, an electronic control module (ECM) of the machine 10. The controller 46 may include a memory, a secondary storage device, a processor, and any other components for running an application. Various other circuits may be associated with the controller such as a power supply circuitry, signal conditioning circuitry, solenoid driver circuitry, and other types of circuitry.

One or more maps or databases relating the signals from the sensor(s) with wear values associated with different track wrap angels may be stored in the memory of the controller 46. Each of these maps or databases may include a collection of data in the form of tables, graphs, and/or equations. The controller 46 may be configured to select the specific maps or databases from available relationship maps or databases stored in the memory of the controller 46 to automatically determine and/or accommodate component wear.

In one embodiment, the controller 46 may be configured to determine an amount of wear experienced by the track assembly 14 based on the track wrap angle α at a specified location(s). If the angle is outside an acceptable limit, then a signal may be sent to an operator informing them of the situation. For example, the higher limit may be exceeded as wear occurs (e.g., the angle increased above this higher limit) proximate to a low idler, or vice versa. On the other hand, a lower limit may be exceeded as wear occurs (e.g., the angle decreased below this lower limit) proximate to an elevated drive sprocket, or vice versa, etc. It is to be understood that the certain embodiments of the present disclosure could include a triangular routed track chain assembly, such as when an elevated drive sprocket such as shown in FIG. 1 is employed, or an oval routed track chain assembly, such as when an inline configuration between the idler and the drive sprocket is employed, etc.

In another embodiment, the controller 46 may be configured to determine a combined amount of wear experienced by the chain assembly, the drive sprocket, and the idlers. That is to say, the controller 46 may determine an approximate total amount of wear experienced by an individual track link (which may be assumed to be the same or similar across all track links), and an idler as a single amount. It is to be understood that the controller may use various tools (e.g., wear tables, algorithms, etc.) to determine an approximate amount of wear experienced by individual components based on the combined wear determination.

The monitoring system 42 may include an on-board computer 48 that is located on the machine (e.g., inside an operator cabin). For instance, the on-board computer 48 may be a dashboard computer including at least a processor and output device such as a display, lights, speaker, etc. The on-board computer 48 may communicate with the controller 46 (e.g., via a wired or wireless connection) to receive the track wrap angle α from the sensor(s) 44. In an exemplary embodiment, the on-board computer 48 may display wear information (e.g., to an operator of the machine 10). This wear information may include, for example, safety messages regarding the state of the track assembly 14, an estimated operating time until service will be necessary, etc.

The monitoring system may also include an off-board computer 50 similarly configured as the on-board computer 48. The off-board computer 50 may also be configured to wirelessly communicate with the controller 46 and/or the on-board computer to similarly receive wear information, which may be displayed to an operator. The wireless communication may include satellite, cellular, infrared, Bluetooth®, and any other type of wireless communication. The conveyed wear information may include messages regarding wear parameters, identification of worn undercarriage components, and/or instructions for the service personnel. In one situation, the wear information may be used to direct service personnel to provide quotes for replacement of undercarriage components to the owner of the machine 10, and/or to schedule service of the machine 10 with the owner. Alerts may be sent other devices such as tablets, phones, etc.

FIGS. 3 and 4 show examples of a track component (e.g., a track link 26 or a track pin 28a) that may include a gyro sensor (44a, 44b) that may be used as part of the wear monitoring system 42 just described herein. Also, a controller 46a may be provided that calculates an amount of wear of a component of the track assembly based on a change in the track wrap angle around the idler.

In some embodiments, the controller 46a may be on the track component itself and may track or measure that change in the track wrap angle at a particular position on the track assembly over a period of time. The controller 46a may have a signaling device (e.g., a wireless signaling device 46b such as described earlier herein) that is configured to send a signal if the change in the track wrap angle reaches a threshold amount. This signal may be encoded with information concerning the location at which the track wrap angle was measured (e.g., using a global positioning system (GPS)), as well as the identity of the track component, etc.

Focusing on FIG. 4, a portion of the track chain assembly 18 may be seen and includes at least four track links 26 that are pivotally connected to each other by a bushing 28b and a track pin 28a. The interior of the track pin 28a may be bored out, forming a central oil reservoir 52, and an oil supply passage 54 extending down from the oil reservoir 52. A thrust ring 56 and seal 58 are also shown. In lieu of or in addition to a typical rubber stopper or plug, a gyro sensor 44b may be provided. Other configurations for the track chain assembly are possible in other embodiments of the present disclosure.

In general, any component discussed herein may be made from any suitable material, including, but not limited to, iron, steel, cast-iron, grey-cast iron, white iron, etc. Also, any component discussed herein may be heat treated, induction hardened, carburized, coated, etc.

INDUSTRIAL APPLICABILITY

A track component with a track wrap angle sensor, a track assembly including one or more of these components with a track wrap angle sensor, and/or a wear monitoring system that is configured according to any embodiment discussed herein may be provided as a replacement part or retrofit in the field or in an OEM (Original Equipment Manufacturer) context.

Figure 5:
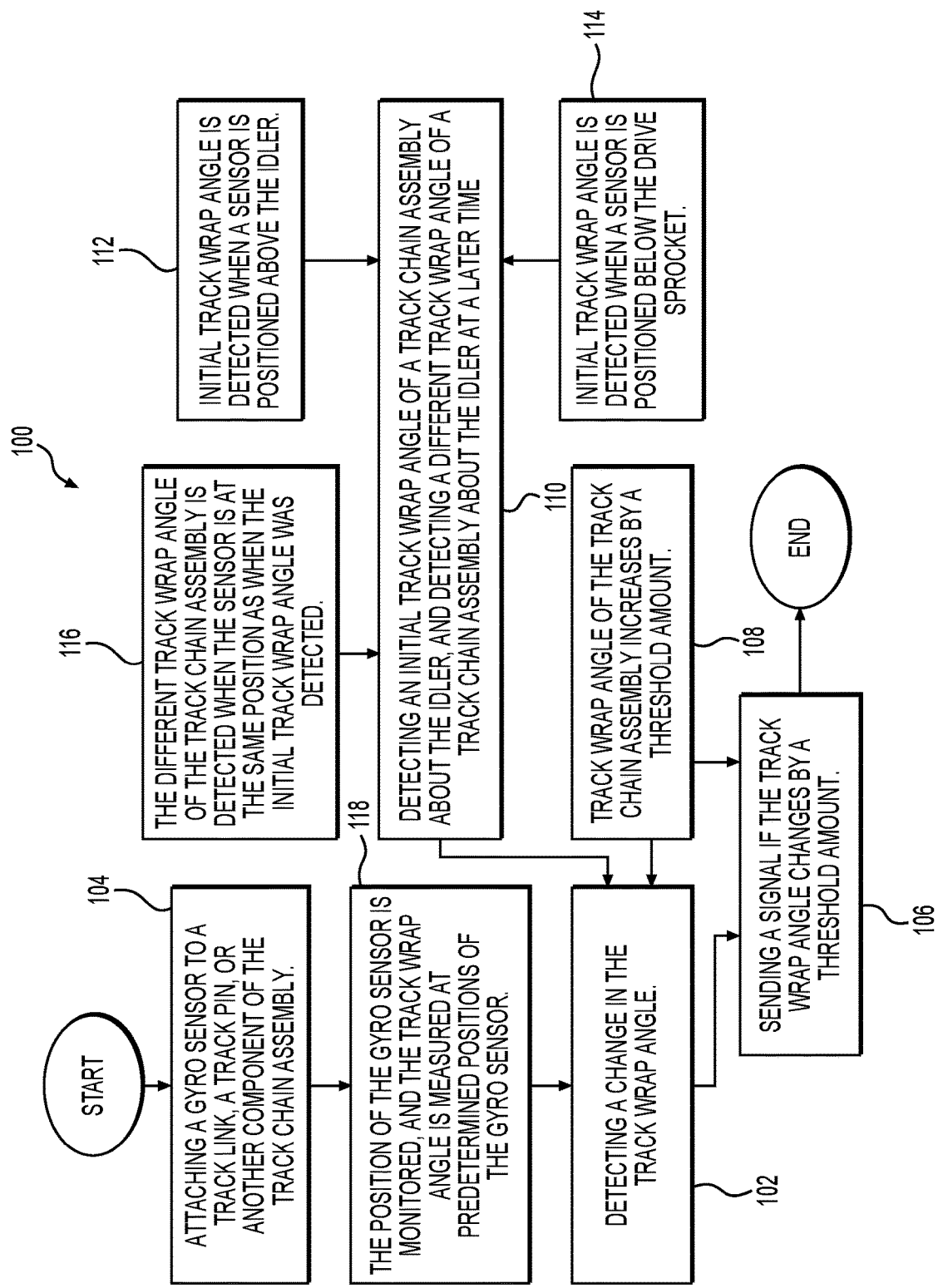
FIG. 5 is a flow chart depicting a method of monitoring the wear of a track assembly using a gyro sensor according to an embodiment of the present disclosure.

FIG. 5 illustrates a method that may be implemented using any of the aforementioned embodiments. The method 100 may comprise detecting a change in the track wrap angle (step 102). This may be accomplished by first attaching a gyro sensor to a track link, a track pin, or another component of the track chain assembly (step 104).

Eventually, enough wear may occur that the angle changes by a threshold amount. If so, the method may further comprise sending a signal if the track wrap angle changes by the threshold amount (step 106). In certain embodiments, step 106 includes sending a signal when the track wrap angle increases by a threshold amount (see 108) as may be the case as the idler or the track link wears.

In other embodiments, the signal may be sent continuously or at periodic time intervals to indicate what the track wrap angle is at certain points. In such a case, step 102 may comprise detecting an initial track wrap angle of a track chain assembly about the idler, and detecting a different track wrap angle of a track chain assembly about the idler at a later time (step 110).

In some embodiments, the initial track wrap angle is detected when a sensor is positioned above the idler (see 112) and/or below the drive sprocket (see 114).

Generally, the different track wrap angle of the track chain assembly may be detected when the sensor is at the same position as when the initial track wrap angle was detected (see 116). This may be accomplished via GPS.

Similarly, the position of the gyro sensor may be monitored continuously, and the track wrap angle may be measured, and/or sent when the gyro reaches predetermined positions of the gyro sensor (see 118).

Once sufficient wear has been detected, then the machine may be serviced. This monitoring system may hone the servicing interval so as to maximize the time the machine is in operation while also minimizing the time and cost to service the machine.

Also, the method may be performed with only one component/sensor being placed on the machine if so desired. This may make the system more robust if the component/sensor are robustly designed and manufactured.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

What is claimed is:

1. A track assembly for a mobile machine comprising:
   a track chain assembly including a plurality of track components, wherein the track components include: a track pin, a track shoe, and a track link;
   a drive sprocket;
   an idler; and
   a wear monitoring system including:
   a gyro sensor that is attached to at least one of the plurality of track components, wherein the gyro sensor is configured to measure a track wrap angle, and wherein the gyro sensor is attached to at least one of the track pin, the track shoe, or the track link.

2. The track assembly of claim 1, wherein the drive sprocket is elevated above the idler, and further comprising a roller assembly including a plurality of rollers.

3. The track assembly of claim 2, wherein the gyro sensor is disposed above an idler.

4. The track assembly of claim 3, wherein the gyro sensor is disposed below the drive sprocket.

5. The track assembly of claim 1, wherein the wear monitoring system includes a controller that is in communication with the gyro sensor, the controller being configured to determine an amount of wear of the track assembly based on a track wrap angle of the track chain assembly.

6. The track assembly of claim 1, wherein wear monitoring system includes a plurality of gyro sensors that are attached to the plurality of track components such that the plurality of gyro sensors are attached to different track components of the plurality of track components.

7. The track assembly of claim 1, wherein the gyro sensor is communicatively coupled to a controller that measures a change in a track wrap angle.

8. The track assembly of claim 7, wherein the controller is not attached to the track chain assembly.

9. The track assembly of claim 7, wherein the controller measures the track wrap angle when the at least one of the plurality of track components is positioned at one or more predetermined positions.

10. A track component for use with a track assembly including an idler, the track component comprising:
    a gyro sensor that monitors a track wrap angle about the idler, wherein the gyro sensor is mounted to one of a track pin, a track shoe, or a track link.

11. The track component of claim 10, further comprising a controller that measures a change in the track wrap angle, and a signaling device that is configured to send a signal if the change in the track wrap angle reaches a threshold amount.

12. A method of monitoring wear of a track assembly including a track link, a drive sprocket, a track pin, and an idler, wherein a gyro sensor is attached to one or more of the track link or the track pin, the method comprising:
    detecting a change in a track wrap angle, wherein detecting a change in the track wrap angle includes detecting an initial track wrap angle of a track chain assembly about the idler, and detecting a different track wrap angle of a track chain assembly about the idler at a later time.

13. The method of claim 12, further comprising sending a signal if the track wrap angle changes by a threshold amount.

14. The method of claim 13, wherein sending the signal if the track wrap angle changes by the threshold amount includes the track wrap angle of the track chain assembly increasing by a threshold amount.

15. The method of claim 12, wherein the initial track wrap angle is detected when a sensor is positioned above the idler.

16. The method of claim 15, wherein the different track wrap angle of the track chain assembly is detected when the sensor is at the same position as when the initial track wrap angle was detected.

17. The method of claim 12, wherein a position of the gyro sensor is monitored, and the track wrap angle is measured at one or more predetermined positions of the gyro sensor.

18. The method of claim 15, wherein the initial track wrap angle is detected when a sensor is positioned below the drive sprocket.

\* \* \* \* \*